(No Model.)
V. H. PERRY.
DRIVE CHAIN.
No. 564,760. Patented July 28, 1896.
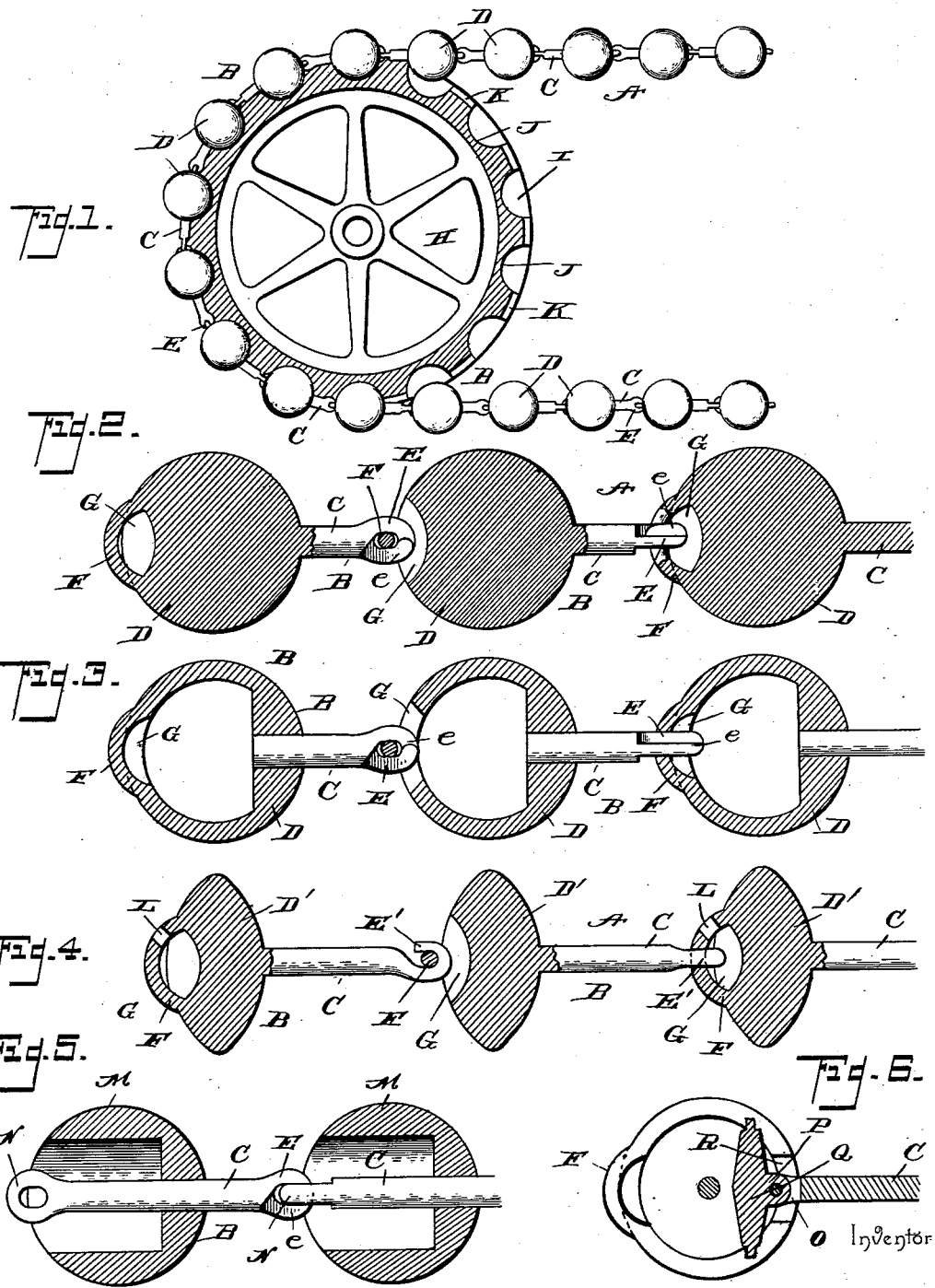

UNITED STATES PATENT OFFICE.

VER H. PERRY, OF STORM LAKE, IOWA.

DRIVE-CHAIN.

SPECIFICATION forming part of Letters Patent No. 564,760, dated July 28, 1896.

Application filed March 30, 1895. Serial No. 543,899. (No model.)

*To all whom it may concern:*

Be it known that I, VER H. PERRY, a citizen of the United States, residing at Storm Lake, in the county of Buena Vista and State of Iowa, have invented a new and useful Drive-Chain, of which the following is a specification.

This invention relates to drive-chains; and it has for its object to effect certain improvements in endless drive-chains of that class composed of detachable links.

To this end the main and primary object of the present invention is to provide certain improvements in drive-chains, which, while consisting of readily-detachable links, at the same time will allow the greatest possible amount of play, so as to be readily adapted for use in connection with endless elevators, conveyers, and in fact in all kinds of gearing employing endless drive-chains; and with these several objects the invention contemplates a chain having exceptional strength and desirability for the several uses to which the same may be adapted.

With these and other objects in view, which will readily appear as the nature of the invention is better understood, the same consists in the novel construction, combination, and arrangement of parts hereinafter more fully described, illustrated, and claimed.

In the accompanying drawings, Figure 1 is a side elevation of a section of a drive-chain constructed in accordance with this invention, showing the same arranged on a sprocket-wheel of a construction especially adapted for the use of such a chain. Fig. 2 is an enlarged detail sectional view of a short section of drive-chain, showing the simple form thereof. Fig. 3 is a similar view showing the hollow construction of link-balls. Fig. 4 is a similar view showing spheroidal or double-cone-shaped link-balls. Fig. 5 is a similar view showing a slightly-modified construction of chain as adapted for elevators and analogous purposes. Fig. 6 is a similar view showing a modified form of link connection.

Referring to the accompanying drawings, A represents a drive-chain composed of a series of loosely and detachably connected chain-links B. The chain-links B primarily consist of the connecting link-bars C and the rounded or spherical link balls or knobs D, made fast at one end of the said link-bars. The rigid connection between the link-bars and the ball or knob of each link is made in any suitable manner, or by casting the same together, if found expedient or desirable. The outer ends of the link-bars C are provided with the double connecting-hooks E, consisting of reversely-disposed hook extremities e, which provide for a secure and not readily detachable connection with the link bails or loops F, projected from one side of the balls or knobs D in front of the bail-recesses G, which admit of the free play of the hook ends of the link-bars C. By reason of the hook-and-bail connection E and F between the links of the chain A it will be seen that the chain will not only readily adapt itself to passing over sprocket or other wheels, but may be twisted and turned in any direction to cross the chain or to curve it in any direction, as the requirements of the particular gearing may demand, without in any way affecting the connection between the links, which links are connected by passing the bails or loops F between the hooks e and then turning the bail or loop into the eye of said hooks, as shown in the drawings, and the disengagement is effected in the same manner.

The construction of chain just described is the most substantial of the several forms illustrated in the drawings, and is usually employed in connection with a sprocket-wheel H, of the construction illustrated in Fig. 1 of the drawings, and this sprocket-wheel is provided with the side peripheral flanges I to confine the chain thereon, and directly in its periphery is provided with a regularly-spaced series of ball-sockets J and the link-slots K, connecting the same, the sockets J accommodating the link balls or knobs D and the slots K accommodating the link-bars C.

Certain kinds of gearing will necessarily demand an exceptionally strong chain, such as illustrated in Fig. 2 of the drawings, in which the balls or knobs D are made solid; but in other kinds of work a hollow ball or knob will be found more desirable as making a chain of much lighter weight than the chain illustrated in Fig. 2, and to provide for this the balls or knobs D may be made entirely hollow, as clearly illustrated in Fig. 3 of the drawings, the other construction of the chain being substantially identical with that already described, and in Fig. 4 of the drawings another modification is observed, in which the shape of the ball or knob D is changed and a spheroidal or double-cone-shaped link-knob D' is employed to provide a chain much stronger than either the constructions shown in Figs. 2 or 3. In the modification just referred to as employing a spheroidal or double-cone-shaped knob D' the link connections are also substantially like those already described; but in connection with this modification it may be observed that instead of providing the link-bars C with a double hook E a single hook E' may be employed, and which is adapted to be placed in engagement with the bail or loop F by slipping the same over the reduced or notched portion L, with which the bail or loop is provided, when a single connecting-hook is adapted to be engaged therewith. The reduction or notch L is located near one end of the bail or loop, the remaining portion of which is wider than the entrance-opening into the hook E', so as to prevent the disengagement of the said hook therefrom except at the reduction or notch L.

In adapting the chain for elevator or other similar uses I employ hollow balls or knobs M, similar in general construction and appearance to the balls or knobs shown in Fig. 3 of the drawings; but in this modification a more direct pull or strain is placed on the link-bars C, which are extended through and into the hollow body of the link balls or knobs M and terminate at their extremities within the said balls or knobs in the bail-eyes N, which correspond to the bails or loops F, which in the other modifications are extended directly from one side of the balls or knobs, and said bail-eyes N at the ball or knob extremities of the link-bars C are adapted to be engaged by the connecting-hooks E in the same manner as already described; but, as indicated, the last modification just described, while providing the enlargement or ball to engage in the sockets of the sprocket-wheel to secure a strong and firm connection between the chain and wheel, at the same time provides a chain in which all of the strain is placed directly on the link-bars.

While in all the forms of the chain illustrated and described the link-bars have been rigidly connected with the link balls or knobs, it will be obvious that a flexible or loose connection between the bars and the balls or knobs may be made.

As illustrated in Fig. 6 of the drawings, the inner or ball ends of the link-bars C may be bifurcated, as at O, and pivotally connected to the lug P of the pivot-pin Q, the extremities of which pivotally engage in opposite sides of the opening or recess R, formed at one side of the ball or knob, whereby the link-bars and the balls or knobs connected therewith may have a variety of different independent movements so as to properly adjust themselves to different kinds of gearing. The connection just described forms substantially a swivel connection of the link-bars with the balls or knobs, and I have illustrated this connection with a hollow ball or knob, but by recessing one side of the ball or knob the connection could be used in connection with a solid ball or knob.

It is to be noted that when the link-bars C are provided with the double hooks E at one end thereof said link-bars are made of wrought-iron or malleable cast-iron, either of which metals possesses a sufficient spring to admit of a spreading of the reversely-disposed hook extremities e, comprising the double hooks E, whereby said double hooks may be engaged with the link bails or loops F, or with the bail-eyes N, which correspond to such bails or loops in the construction illustrated in Fig. 5 of the drawings.

It will also be noted that the link-balls in the construction illustrated in Fig. 6 are preferably made in duplicate halves or sections suitably riveted or bolted together, so as to provide means for the proper fitting of the pivot-pin Q within the balls when the drive-chain is being constructed, and it will be further noted that in the construction illustrated in Fig. 6 the link-bar C is provided with the double hook E. (Illustrated in Figs. 2, 3, and 5 of the drawings.)

The particular shapes of the enlargements or balls forming a part of each link of the chain may be varied to suit particular kinds of gearing, and other changes or modifications may be observed without affecting the generic principle embodied in the connections shown in the several figures of the drawings, and changes in the form, proportion, and the minor details of construction may be resorted to without departing from the principle or sacrificing any of the advantages of this invention. At this point it is to be noted that the link balls or knobs may be made of any suitable material other than metal, such as wood, leather, or any soft material that is suitable for the purpose, and the different link-bar connections described in connection with the different forms of balls or knobs are to be understood as being different means of connecting the balls or knobs that can be employed with any form illustrated, although the preferred form of connections with the particular forms of balls or knobs are shown and described together.

Referring again to the hollow balls or knobs, it is to be observed that such balls or knobs act in the capacity of elevator-cups for the elevation or conveying of material, and may be either cast with or separately secured on the bars C.

Having thus described the invention, what is claimed, and desired to be secured by Letters Patent, is—

1. A drive-chain consisting of a series of detachable links, each comprising a straight link-bar provided at one end with a hook and carrying a link-enlargement, said link-enlargement being provided at the side opposite the hook end of the link-bar with a recess, and a bail projecting out of said recess and adapted to be engaged by the hook of an adjacent link-bar, substantially as set forth.

2. The herein-described drive-chain consisting of a series of detachable links comprising link-bars with double connecting-hooks at one end, and carrying link-balls provided at one side with recesses and with link-bails projecting out of said link-recesses for engagement with said hooks, substantially as set forth.

3. A drive-chain consisting of the links comprising link-balls provided at one side with link bails or loops, and the link-bars provided at one end with a hook and at their other ends having a double pivotal connection with one side of the link-balls, substantially as set forth.

4. A drive-chain consisting of the links comprising link-balls provided at one side with link bails or loops, and at opposite sides with turning pivot-pins, and the link-bars pivotally connected at one end to said turning pivot-pins and provided with hooks at their other ends, substantially as set forth.

In testimony that I claim the foregoing as my own I have hereto affixed my signature in the presence of two witnesses.

VER H. PERRY.

Witnesses:
J. W. PLANALP,
GEORGE L. READER.